(12) United States Patent
Yadav

(10) Patent No.: US 10,734,657 B2
(45) Date of Patent: Aug. 4, 2020

(54) STRETCHED CATALYST LAYER HAVING POROUS IONOMER FILM AND METHOD OF PRODUCING SAME

(71) Applicant: Nissan North America, Inc., Franklin, TN (US)

(72) Inventor: Rameshwar Yadav, Farmington, MI (US)

(73) Assignee: Nissan North America, Inc., Franklin, TX (US)

( * ) Notice: Subject to any disclaimer, the term of this patent is extended or adjusted under 35 U.S.C. 154(b) by 136 days.

(21) Appl. No.: 15/445,194

(22) Filed: Feb. 28, 2017

(65) Prior Publication Data

US 2018/0248198 A1   Aug. 30, 2018

(51) Int. Cl.
*H01M 4/88* (2006.01)
*H01M 4/92* (2006.01)
(Continued)

(52) U.S. Cl.
CPC ............ *H01M 4/8878* (2013.01); *B32B 5/16* (2013.01); *B32B 9/007* (2013.01); *B32B 9/048* (2013.01); *B32B 27/14* (2013.01); *B32B 27/281* (2013.01); *B32B 27/322* (2013.01); *B32B 37/025* (2013.01); *H01M 4/881* (2013.01); *H01M 4/8807* (2013.01); *H01M 4/8814* (2013.01); *H01M 4/8828* (2013.01); *H01M 4/926* (2013.01); *H01M 8/1004* (2013.01); *H01M 8/1023* (2013.01); *H01M 8/1039* (2013.01); *B32B 2038/0028* (2013.01);
(Continued)

(58) Field of Classification Search
CPC .. H01M 4/8878; H01M 8/1039; H01M 8/103; H01M 8/1023; H01M 8/1004; H01M 4/8828; H01M 4/8814; H01M 4/881; H01M 4/8807; H01M 4/926; B32B 27/281; B32B 27/322; B32B 27/14; B32B 9/048; B32B 9/007; B32B 5/16; B32B 37/025; B32B 2264/12; B32B 2264/108; B32B 2264/105; B32B 2300/0082; B32B 2008/1095; B32B 2004/8689; B32B 2457/18; B32B 2333/00; B32B 2313/04; B32B 2311/06; B32B 2305/026; B32B 2379/08
See application file for complete search history.

(56) References Cited

U.S. PATENT DOCUMENTS

| 8,298,719 | B2 | 10/2012 | Mossman et al. | |
| 8,765,323 | B2 | 7/2014 | Yamada et al. | |
| 2004/0121220 | A1* | 6/2004 | Ikoma | H01M 4/926 429/480 |
| 2005/0238932 | A1* | 10/2005 | Koyama | H01M 4/8626 429/413 |

(Continued)

OTHER PUBLICATIONS

Machine translation of Hoshi JP11-354129 (Year: 1999).*
(Continued)

*Primary Examiner* — Lisa S Park
(74) *Attorney, Agent, or Firm* — Global IP Counselors, LLP

(57) ABSTRACT

A membrane electrode assembly is provided that includes a polymer electrolyte membrane and a catalyst layer provided on a surface of the polymer electrolyte membrane. The catalyst layer comprises catalyst particles and an ionomer film surrounding each of the catalyst particles. The ionomer film has an oxygen permeability of approximately $6.0 \times 10^{12}$ mol/cm/s to $15.0 \times 10^{12}$ mol/cm/s at 80° C. and a relative humidity of approximately 30% to 100%.

13 Claims, 6 Drawing Sheets

(51) Int. Cl.
*H01M 8/103* (2016.01)
*H01M 8/1023* (2016.01)
*H01M 8/1039* (2016.01)
*H01M 8/1004* (2016.01)
*B32B 27/14* (2006.01)
*B32B 27/28* (2006.01)
*B32B 27/32* (2006.01)
*B32B 37/00* (2006.01)
*B32B 5/26* (2006.01)
*B32B 9/00* (2006.01)
*B32B 9/04* (2006.01)
*B32B 5/16* (2006.01)
*H01M 8/1018* (2016.01)
*B32B 38/00* (2006.01)

(52) U.S. Cl.
CPC ... *B32B 2264/105* (2013.01); *B32B 2264/108* (2013.01); *B32B 2264/12* (2013.01); *B32B 2305/026* (2013.01); *B32B 2311/06* (2013.01); *B32B 2313/04* (2013.01); *B32B 2333/00* (2013.01); *B32B 2379/08* (2013.01); *B32B 2457/18* (2013.01); *H01M 2008/1095* (2013.01); *H01M 2300/0082* (2013.01)

(56) References Cited

U.S. PATENT DOCUMENTS

| | | | |
|---|---|---|---|
| 2006/0199062 A1* | 9/2006 | Yanagita | C08F 6/02 429/483 |
| 2010/0104316 A1* | 4/2010 | Hoshio | G03G 15/0233 399/100 |
| 2010/0196594 A1 | 8/2010 | Kim et al. | |
| 2010/0227249 A1* | 9/2010 | Kawamura | H01M 4/8605 429/483 |
| 2010/0242733 A1* | 9/2010 | Shimatani | B01D 71/36 96/12 |
| 2013/0196245 A1 | 8/2013 | Kandoi et al. | |
| 2016/0141696 A1* | 5/2016 | Tago | C08J 5/2237 429/408 |

OTHER PUBLICATIONS

Sambandam et al. Phys. Chem. Chem. Phys., 2013, 15, 14994 (Year: 2013).*
English machine translation of Miki JP2010-186660 (Year: 2010).*
"Influence of ionomer content on the proton conduction and oxygen transport in the carbon-supported talyst layers in DMFC", X Zhao, Jun. 2012.

* cited by examiner

_US 10,734,657 B2_

STRETCHED CATALYST LAYER HAVING POROUS IONOMER FILM AND METHOD OF PRODUCING SAME

BACKGROUND

Field of the Invention

The present invention generally relates to a stretched catalyst layer having a porous ionomer film in a membrane electrode assembly and a method of producing such a stretched catalyst layer. More specifically, the present invention relates to a membrane electrode assembly including a polymer electrolyte membrane and a catalyst layer provided either on a surface of the polymer electrolyte membrane or on a surface of the gas diffusion layer. The catalyst layer comprises catalyst particles and an ionomer film surrounding each of the catalyst particles. The ionomer film has an oxygen permeability of approximately 6.0 to $15.0 \times 10^{12}$ mol/cm/s at 80° C. at an RH of 30-100%.

Background Information

Polymer electrolyte membrane fuel cells (PEMFCs) generate power from the electrochemical conversion of fuels such as hydrogen and hydrocarbons at an anode and oxidants such as oxygen and air at a cathode. PEMFCs include a membrane electrode assembly that comprises a polymer electrolyte membrane, anode and cathode side catalyst layers on opposite sides of the membrane, and gas diffusion layers on the outer surface of each of the catalyst layers. The anode side catalyst layer and the anode side gas diffusion layer form the anode, and the cathode side catalyst layer and the cathode side gas diffusion layer form the cathode. The membrane acts as both a proton conductor and a barrier between the fuel and oxidants.

Conventional PEMFCs use a cathode catalyst layer that includes carbon-supported catalyst particles in which noble metal particles, typically platinum, are supported by larger carbon particles dispersed within an ionomer. The ionomer forms a thin film around the carbon-supported catalyst particles. The activity of the catalyst particles and, thus, the overall performance of the cathode, is dependent on the ability of oxygen particles to penetrate the ionomer film and reach the noble metal particles, i.e., the electrocatalyst sites, on the surface of the carbon particles.

Proton conduction and oxygen transport through the cathode are generally affected by the amount and dispersion of ionomer in the catalyst layer. For example, it is known that the overall porosity of the catalyst layer is dependent on the amount of ionomer mixed with catalyst particles. However, even if the overall porosity of the catalyst layer can be increased by adjusting the amount of ionomer used in the catalyst layer, there is a need for further improvement in the oxygen transport to the electrocatalyst sites on the individual catalyst particles.

SUMMARY

It has been discovered that in order to improve the oxygen transport through the thin ionomer film surrounding the catalyst particles, an improved catalyst layer is needed.

In particular, it has been discovered that conventional thin ionomer films in catalyst layers have zero porosity and, thus, a very low oxygen permeability. Therefore, it is desirable to provide a catalyst layer in which the thin ionomer film surrounding the catalyst particles has an improved oxygen permeability.

In view of the state of the known technology, one aspect of the present disclosure is to provide a membrane electrode assembly. The membrane electrode assembly includes a polymer electrode membrane and a catalyst layer provided on a surface of the polymer electrolyte membrane. The catalyst layer includes catalyst particles and an ionomer film surrounding each of the catalyst particles. The ionomer film has an oxygen permeability of approximately 6.0 to $15.0 \times 10^{12}$ mol/cm/s at 80° C. at an RH of 30-100%.

Another aspect of the present disclosure is to provide a method for producing a porous catalyst layer in a fuel cell. The method includes providing a catalyst composition on a substrate to form a catalyst layer on the substrate, stretching the substrate together with the catalyst layer formed thereon to form a stretched substrate and a stretched catalyst layer, and transferring the stretched catalyst layer on the stretched substrate to the one of the membrane and the gas diffusion layer. The catalyst composition includes catalyst particles and an ionomer film surrounding each of the catalyst particles.

One aspect of the present disclosure is to provide a method for producing a porous catalyst layer in a fuel cell. The method includes providing a catalyst composition on one of a gas diffusion layer and a membrane layer to form a catalyst layer on the one of the gas diffusion layer and the membrane layer, and stretching the one of the gas diffusion layer and the membrane layer together with the catalyst layer formed thereon. The catalyst composition comprises catalyst particles and an ionomer film surrounding each of the catalyst particles.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
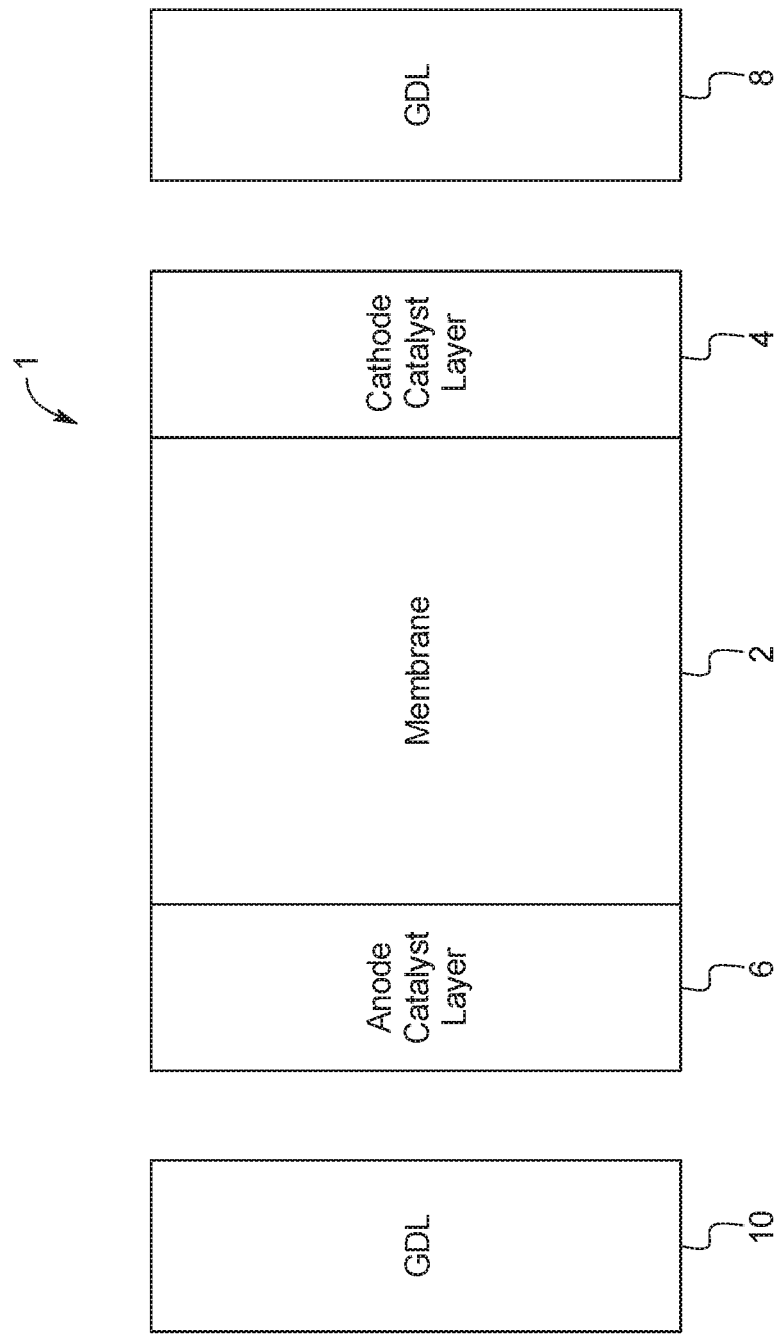
FIG. 1 is a schematic view of a membrane electrode assembly according to one embodiment.

Referring initially to FIG. 1, a membrane electrode assembly 1 is illustrated that includes a membrane 2, a cathode catalyst layer 4 on one side of the membrane, an anode catalyst layer 6 on the opposite side of the membrane, a cathode gas diffusion layer 8 on the cathode side of the membrane and an anode gas diffusion layer 10 on the anode side of the membrane in accordance with a first embodiment. The membrane electrode assembly 1 can be incorporated in a fuel cell.

The membrane 2 is a polymer electrolyte membrane. The membrane 2 is a semipermeable membrane that acts as both a proton conductor and a barrier that separates the fuel and oxidants. The membrane 2 can be formed of a polymer, such as an ionomer, or a composite material in which materials are embedded in a polymer matrix. For example, the membrane 2 can be formed of a fluoropolymer such as perfluorosulfonic acid or perfluoroimide acid. The membrane 2 is preferably a perfluorosulfonic acid membrane sold under the trade name Nafion™ or Aquivion™, or a perfluorosulfonic acid-perfluoroimide acid mixed membrane. The membrane 2 may include a cross-linked polymer.

The cathode catalyst layer 4 includes cathode catalyst particles and an ionomer. The cathode catalyst layer 4 can further include a binder. The cathode catalyst particles are dispersed within the ionomer. The cathode catalyst particles preferably include an electrocatalyst including at least one noble metal, such as platinum, palladium, gold, rhodium, ruthenium, iridium and/or alloys thereof, and optionally a transition metal such as cobalt, iron and/or nickel. The cathode catalyst particles can further include support particles comprising carbon or a metal oxide doped with a conductive metal. For example, the cathode catalyst particles can be platinum particles supported by carbon particles, a mixture of platinum and nickel particles supported by carbon particles, a mixture of platinum and cobalt particles supported by carbon particles, a mixture of platinum and ruthenium particles supported by carbon particles, or a mixture of platinum and iron particles supported by carbon particles.

The anode catalyst layer 6 includes anode catalyst particles. The anode catalyst layer 6 can further include an ionomer and/or a binder in which the anode catalyst particles are dispersed. As with the cathode catalyst particles, the anode catalyst particles preferably include an electrocatalyst including at least one noble metal, such as platinum, palladium, rhodium, ruthenium, iridium and/or alloys. The anode catalyst particles can further include support particles comprising carbon or a metal oxide doped with a conductive metal. For example, the anode catalyst particles can be platinum particles supported by carbon particles.

The cathode gas diffusion layer 8 is a porous layer configured to allow the flow of oxidant gas therethrough. The cathode gas diffusion layer ("GDL") 8 can be a carbon paper or a woven carbon fabric. The GDL can include a hydrophobic coating such as polytetrafluoroethylene ("PTFE"). The GDL can also include a microporous layer to improve the contact with the membrane and increase the surface area to allow the oxidant to reach the electrocatalyst sites in the cathode catalyst layer 4.

The anode GDL 10, like the cathode GDL, is a porous layer configured to allow the flow of fuel gas therethrough. The anode GDL 10 can be a carbon paper or a woven carbon fabric. The GDL can include a hydrophobic coating such as polytetrafluoroethylene ("PTFE"). The GDL can also include a microporous layer to improve the contact with the membrane and increase the surface area to allow the fuel to reach the electrocatalyst sites in the anode catalyst layer 6.

Figure 2:
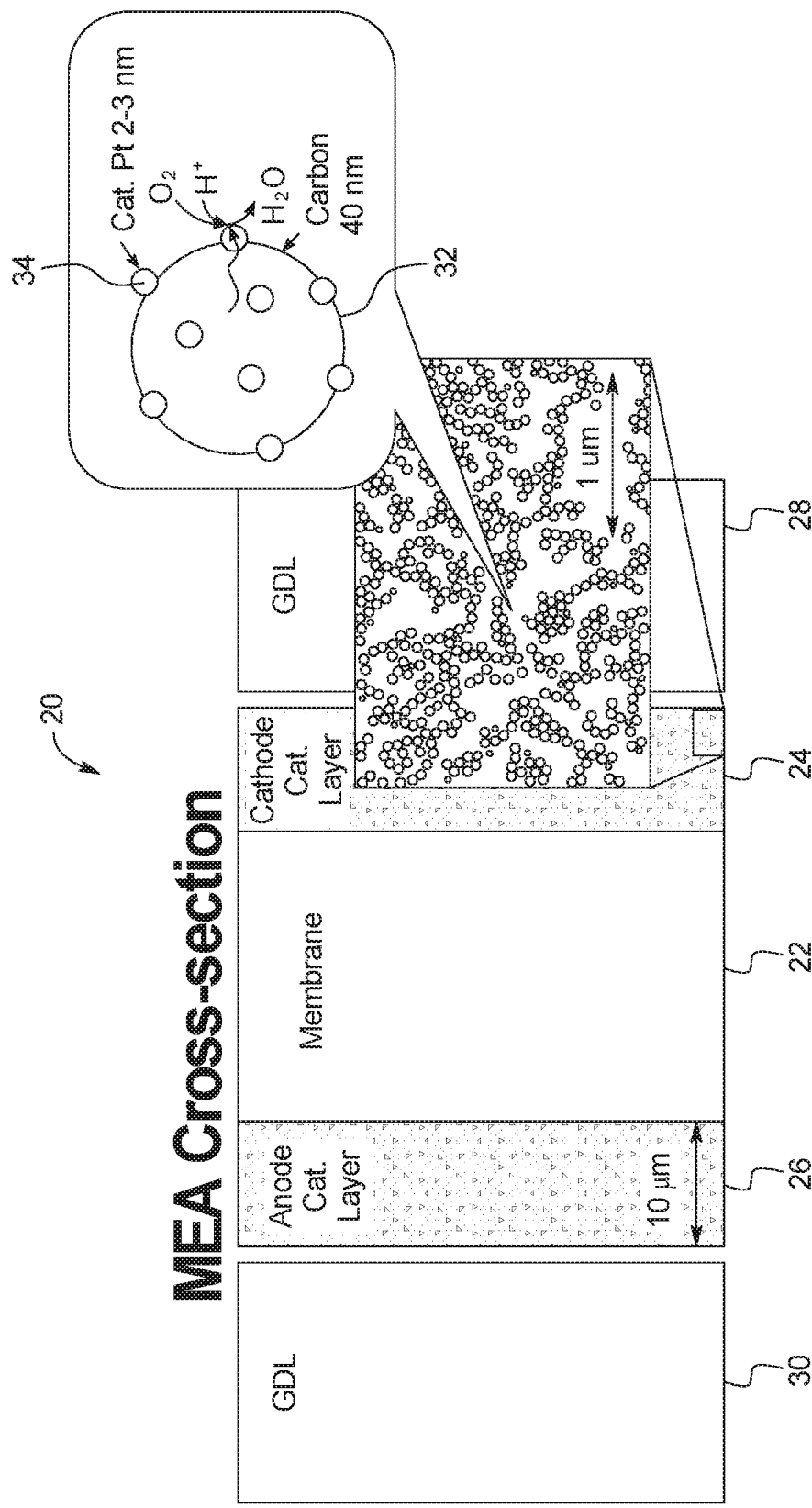
FIG. 2 is a cross-sectional view of the membrane electrode assembly according to an embodiment.

FIG. 2 shows a cross-section of a membrane electrode assembly 20 in an embodiment. The membrane electrode assembly 20 includes a membrane 22, a cathode catalyst layer 24 provided on one side of the membrane 22, an anode catalyst layer 26 provided on an opposite side of the membrane 22, a cathode GDL 28 provided on a side of the cathode catalyst layer 24, and an anode GDL 30 provided on a side of the anode catalyst layer 26.

The membrane 22 is a polymer electrolyte membrane and can be formed of the same material as the membrane 2. For example, the membrane 2 may include a cross-linked polymer, a fluoropolymer such as perfluorosulfonic acid, perfluoroimide acid, or a mixture thereof, or a composite material in which materials are embedded in a polymer matrix. The membrane has a suitable thickness, for example ranging from 10 μm to 25 μm.

As shown in FIG. 2, the cathode catalyst layer 24 includes carbon support particles 32 and platinum particles 34 provided on the surface of the support particles 32. The carbon support particles 32 have a diameter of approximately 40 nm. The platinum particles 32 have a diameter between 2 nm and 3 nm. FIG. 2 shows nine platinum particles 34 provided on the surface of the support particles 32. However, it should be understood that the surface of the support particles 32 may include any suitable number of platinum particles 34. The carbon support particles 32 with the platinum particles 34 provided thereon are dispersed in an ionomer such as Nafion™.

The amount of platinum electrocatalyst included in the cathode catalyst layer 24 can be any suitable amount necessary to produce a desired reaction in a fuel cell including the membrane electrode assembly. For example, the platinum loading in the catalyst layer ranges from 0.05 mg/cm$^2$ to 0.40 mg/cm$^2$.

The weight ratio of platinum electrocatalyst particles to carbon support particles can be any suitable amount. For example, the weight percent of platinum relative to the weight percent of carbon ranges from 10 weight percent to 40 weight percent.

The amount of ionomer included in the cathode catalyst layer 24 can be any suitable amount necessary to achieve the desired porosity in the cathode catalyst layer 24. For example, the amount of ionomer included in the cathode catalyst layer 24 ranges from 20 weight percent to 45 weight percent relative to the total weight of the cathode catalyst layer 24. The weight ratio of ionomer to carbon support particles 32 ranges from 0.5 to 1.5.

The cathode catalyst layer 24 has a thickness ranging from 5 μm to 25 μm. The bulk porosity of the cathode catalyst layer 24 ranges from 20 volume % to 50 volume % with respect to a total volume of the catalyst layer 24 and can be adjusted by changing the amount of ionomer included in the cathode catalyst layer 24.

The anode catalyst layer 26 has a thickness of approximately 10 μm. The anode catalyst layer 26 includes support particles and metal particles provided on a surface of the support particles. For example, the anode catalyst layer 26 can include platinum particles provided on the surface of the support particles as in the cathode catalyst layer 24. The anode catalyst layer 26 may also be formed of the same materials as the anode catalyst layer 6.

The cathode GDL 28 and the anode GDL 30 can each be a carbon paper or a woven carbon fabric that optionally includes a hydrophobic coating and/or a microporous layer. For example, the cathode GDL 28 and the anode GDL 30 can be formed of the same materials, respectively, as the cathode GDL 8 and the anode GDL 10.

Figure 3:
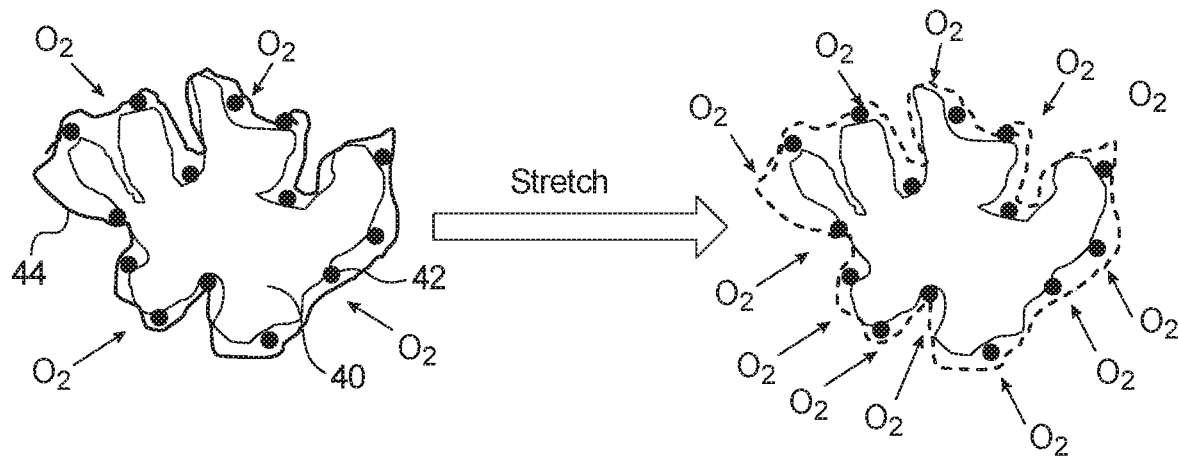
FIG. 3 is a schematic view of a catalyst particle before and after stretching according to an embodiment.

FIG. 3 illustrates a schematic view of a catalyst particle before and after stretching according to an embodiment. The catalyst particle may be included in an anode catalyst layer or a cathode catalyst layer of a membrane electrode assembly as shown in FIGS. 1 and 2. The catalyst particle includes a support particle 40, particles 42 provided on the surface of the support particle, and a thin ionomer film 44 surrounding the support particle 40 and the particles 42. The catalyst particle is one of a plurality of catalyst particles dispersed within an ionomer in an anode catalyst layer or a cathode catalyst layer. The catalyst particle is preferably used in a cathode catalyst layer.

The support particle 40 can be formed of carbon or a metal oxide doped with a conductive metal. The support particle 40 is preferably a high surface area carbon particle having a diameter of 20 nm to 50 nm. For example, the carbon used in the support particle 40 may be Ketjenblack®, acetylene black, graphitized carbon, carbon black such as Vulcan® XC72R or Black Pearls® BP 2000.

The particles 42 provided on the surface of the support particle 40 include at least one noble metal, such as platinum, palladium, gold, rhodium, ruthenium, iridium and/or alloys thereof. The particles 42 can also include a transition metal such as cobalt, iron and/or nickel. For example, the catalyst particle can be platinum particles supported by a carbon particle, a mixture of platinum and nickel particles supported by a carbon particle, a mixture of platinum and cobalt particles supported by a carbon particle, a mixture of platinum and ruthenium particles supported by a carbon particle, or a mixture of platinum and iron particles supported by a carbon particle. The particles 42 are preferably platinum particles having a diameter of 3 nm to 10 nm.

The ionomer film 44 can be formed of an ionomer such as perfluorosulfonic acid or a mixture of perfluorosulfonic acid and perfluoroimide acid. The ionomer film 44 preferably has a thickness of 1 nm to 10 nm.

As shown in FIG. 3, the ionomer used in the catalyst layer forms a thin ionomer film 44 around the support particle 40 and the particles 42. Before stretching, the ionomer film 44 has virtually no porosity and a low oxygen permeability. Therefore, the ability of the oxygen reactant to reach the particles 42, i.e., the electrocatalyst sites, on the catalyst particle is limited by the oxygen permeability of the ionomer film 44.

However, after stretching, the ionomer film 44 has spaces or gaps and, thus, the oxygen permeability of the ionomer film 44 can be improved, thereby improving the mass transport of oxygen to the electrocatalyst sites 42 on the catalyst particle.

Figure 4:
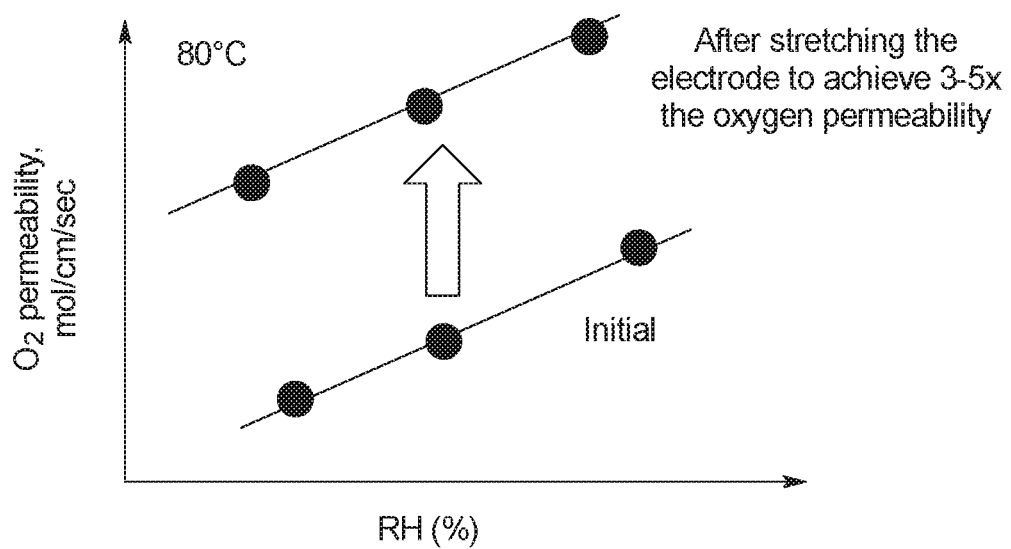
FIG. 4 is a graph of oxygen permeability of the ionomer film around the catalyst particle of FIG. 3 before and after stretching.

FIG. 4 is a graph showing the improvement in oxygen permeability in the ionomer film 44 of FIG. 3 after stretching. The y axis represents the oxygen permeability in mol/cm/sec, and the x axis represents the relative humidity at 80° C. of a membrane electrode assembly including a catalyst layer containing the catalyst particle shown in FIG. 3. As shown in FIG. 4, the oxygen permeability of the ionomer film 44 around the catalyst particle is a function of the relative humidity of the membrane electrode assembly, and the oxygen permeability of the ionomer film 44 can be improved by increasing the relative humidity. However, in order to improve the oxygen permeability of the ionomer film 44 at a given relative humidity, it has been discovered that the ionomer film 44 can be "stretched" by stretching the whole catalyst layer containing the ionomer film 44. As shown in FIG. 4, the oxygen permeability of the ionomer film 4 can be increased from an initial value of approximately $2.0 \times 10^{12}$ mol/cm/sec at a relative humidity of 30% and 80° C. to approximately three to five times the initial value or more—$6.0 \times 10^{12}$ mol/cm/sec to $15.0 \times 10^{12}$ mol/cm/sec—by stretching the catalyst layer to create gaps or spaces in the ionomer film 44. In addition, the oxygen permeability of the ionomer film 4 can be increased from an initial value of approximately $2.0 \times 10^{12}$ mol/cm/sec at 30% relative humidity and 80° C. to approximately $20.0 \times 10^{12}$ mol/cm/sec by stretching the catalyst layer. Finally, the oxygen permeability of the ionomer film 4 can be increased from an initial value of approximately $2.0 \times 10^{12}$ mol/cm/sec at 30% relative humidity and 80° C. to approximately $99.0 \times 10^{12}$ mol/cm/sec by stretching the catalyst layer.

Figure 5:
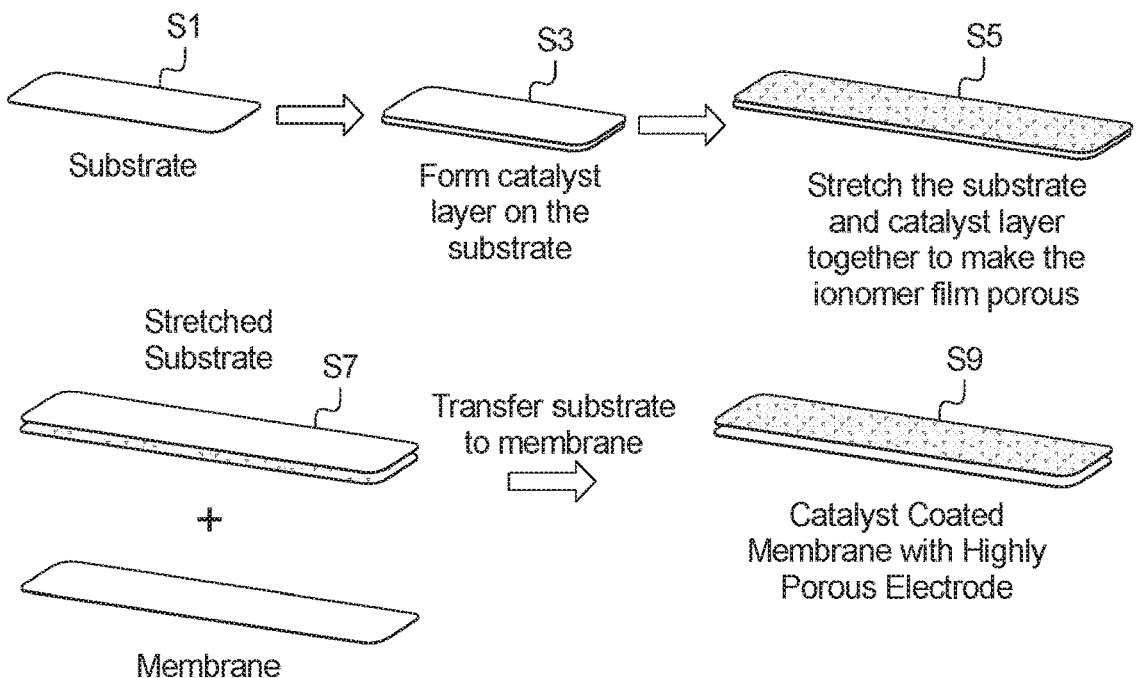
FIG. 5 is an illustrated flow chart showing a process of producing a stretched catalyst layer on a membrane.

FIG. 5 illustrates a process of producing a membrane with a stretched catalyst layer thereon. In step S1, a substrate is provided. The substrate can be a decal, an inert substrate or a hydrophobic substrate. For example, the substrate can be formed of PTFE.

In step S3, a catalyst layer is formed on the substrate. For example, the catalyst layer can be formed on the substrate by spraying, deposition, coating, brushing or any other suitable means of forming a catalyst layer including catalyst particles dispersed within an ionomer. The catalyst layer can also include a binder. The catalyst particles can be formed of the same materials as the catalyst particles in the cathode catalyst layer 4 or the anode catalyst layer 6 of FIG. 1.

For example, the catalyst particles can include support particles with metal or metal alloy electrocatalyst particles provided on a surface thereof, and a thin ionomer film surrounding the support particles and the metal or metal alloy electrocatalyst particles provided on the surface of the support particles. The support particles can include carbon or a metal oxide doped with a conductive metal. The metal or metal alloy electrocatalyst particles can include at least one noble metal, such as platinum, palladium, gold, rhodium, ruthenium, iridium and/or alloys thereof. The electrocatalyst particles can also include a transition metal such as cobalt, iron and/or nickel. For example, the catalyst particles can be platinum particles supported by carbon particles, a mixture of platinum and nickel particles supported by carbon particles, a mixture of platinum and cobalt particles supported by carbon particles, a mixture of platinum and ruthenium particles supported by carbon particles, or a mixture of platinum and iron particles supported by carbon particles.

In step S5, the substrate is stretched together with the catalyst layer to form a stretched catalyst layer on a stretched substrate. By stretching the catalyst layer, the oxygen permeability of the ionomer film surrounding the individual support particles, and the metal or metal alloy particles provided on the surface thereof, can be improved. In particular, by stretching the catalyst layer, gaps or spaces can be created in the ionomer film surrounding the individual support particles to improve the mass transport of oxygen to the electrocatalyst sites on the support particles. The substrate and catalyst layer can be stretched using a stretching machine such as that provided by Intron Corporation.

In step S7, the stretched substrate with the stretched catalyst layer thereon is combined with a membrane. For example, the stretched substrate with the stretched catalyst layer thereon is hot pressed together with the membrane. The hot pressing conditions can vary. For example, when a Nafion™ membrane is used as the membrane, the stretched substrate together with the stretched catalyst layer can be hot pressed with the Nafion™ membrane under a pressure of 2 MPa and a temperature of 130° C.

In step S9, the stretched substrate is removed to transfer the stretched catalyst layer to the membrane. For example, when the stretched catalyst layer is transferred to the membrane using a decal method, the stretched substrate is removed by peeling the stretched substrate from the stretched catalyst layer after hot pressing the stretched catalyst layer with the membrane. However, any suitable method can be used to remove the stretched substrate after combining the stretched catalyst layer with the membrane. For example, the stretched substrate can be chemically removed from the stretched catalyst layer.

Figure 6:
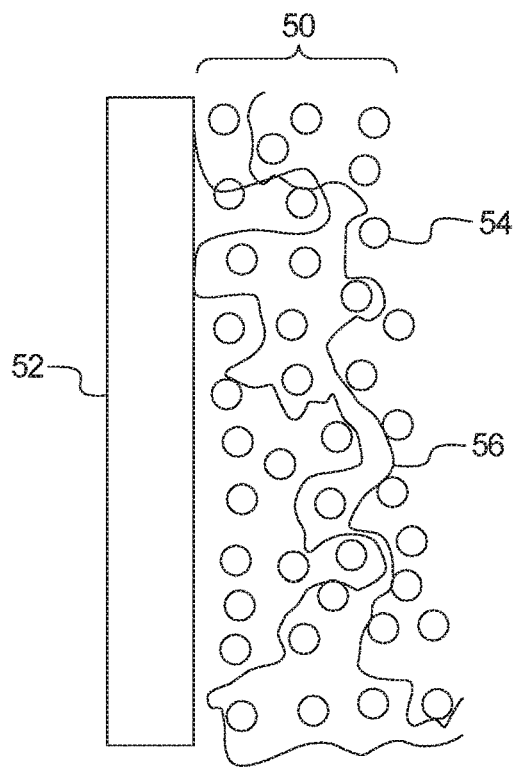
FIG. 6 is a schematic view of a prior art electrode including a catalyst layer.

FIG. 6 illustrates a schematic view of a prior art electrode in a polymer electrolyte membrane fuel cell. As shown in FIG. 6, the prior art electrode includes a catalyst layer 50 provided on a GDL 52. The catalyst layer 50 includes catalyst particles 54 dispersed in an ionomer 56. The ionomer 56 forms a thin film around the catalyst particles 54. Although the overall porosity of the catalyst layer 50 can be adjusted, for example, by adjusting the amount of ionomer, the ionomer film 56 surrounding the catalyst particles 54 has approximately zero porosity and a low oxygen permeability.

Figure 7:
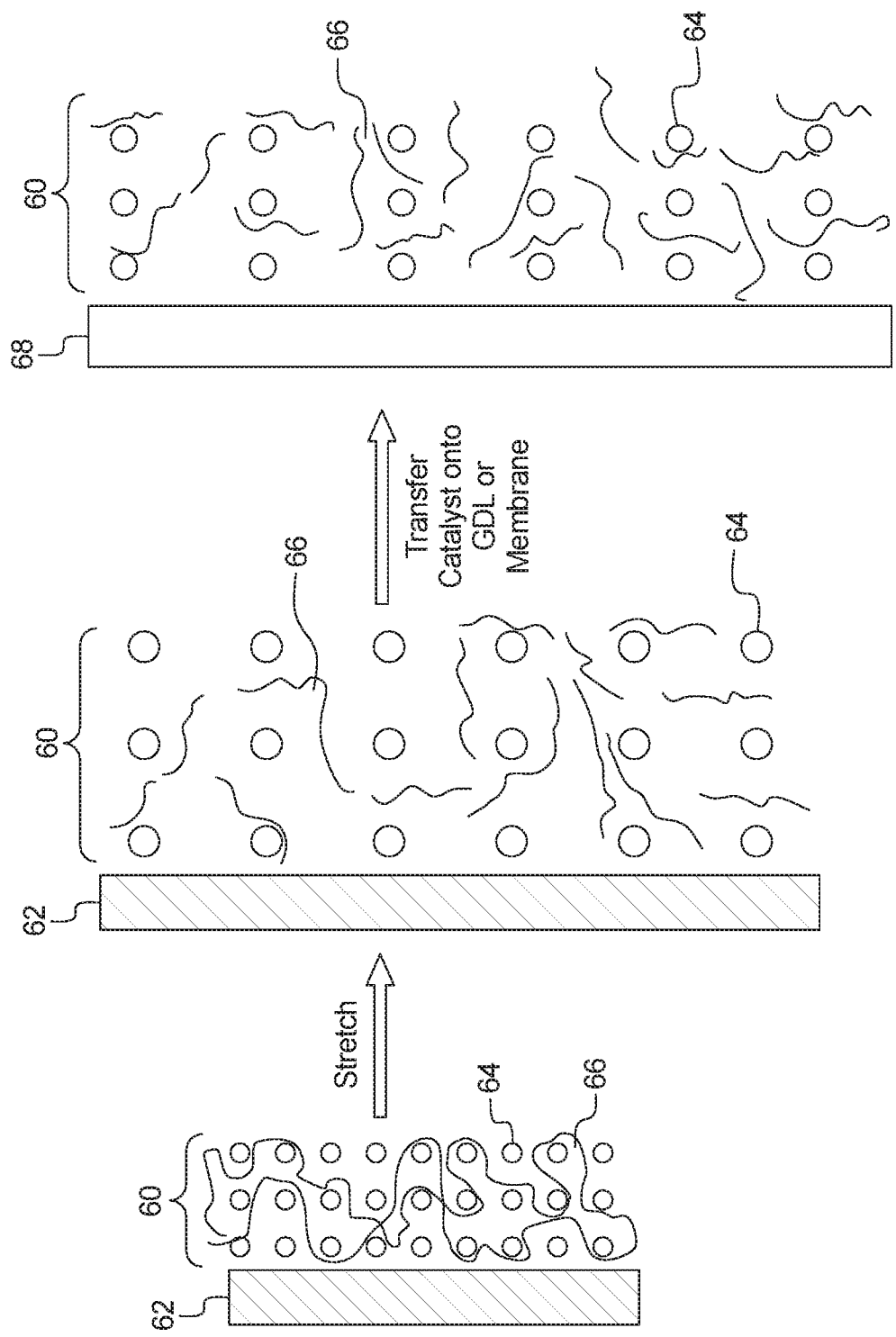
FIG. 7 is a schematic view of a portion of a membrane electrode assembly including a stretched catalyst layer according to an embodiment.

FIG. 7 illustrates a schematic view of a portion of a membrane electrode assembly including a stretched catalyst layer according to an embodiment. A catalyst layer 60 is provided on a substrate 62. The substrate 62 is a decal, an inert substrate or a hydrophobic substrate. For example, the substrate can be formed of PTFE. The catalyst layer 60 includes catalyst particles 64 dispersed in an ionomer 66. The ionomer 66 forms a thin film around the catalyst particles 64. The ionomer film 66 surrounding the catalyst particles 64 initially has approximately zero porosity and a low oxygen permeability similar to the ionomer 56 shown in FIG. 6.

The catalyst particles 64 can be formed of the same materials as the catalyst particles in the cathode catalyst layer 4 or the anode catalyst layer 6 of FIG. 1. For example, the catalyst particles can include at least one noble metal, such as platinum, palladium, gold, rhodium, ruthenium, iridium and/or alloys thereof. The catalyst particles can also include a transition metal such as cobalt, iron and/or nickel. The catalyst particles can further include support particles comprising carbon or a metal oxide doped with a conductive metal. For example, the catalyst particles can be platinum particles supported by carbon particles, a mixture of platinum and nickel particles supported by carbon particles, a mixture of platinum and cobalt particles supported by carbon particles, a mixture of platinum and ruthenium particles supported by carbon particles, or a mixture of platinum and iron particles supported by carbon particles. The ionomer film 66 can be formed of any suitable ionomer, for example perfluorosulfonic acid.

As shown in FIG. 7, the catalyst layer 60 and the substrate then are stretched together to increase the porosity of the ionomer film 66 and, thus, the oxygen permeability of the ionomer film 66.

The catalyst layer 60 is then transferred to a layer 68. The layer 68 is either a GDL or a membrane of a membrane electrode assembly. The ionomer film 66 in the stretched catalyst layer 60 has an increased porosity and oxygen permeability as compared with the ionomer film 66 in the catalyst layer 60 before stretching. Specifically, the ionomer film 66 in the stretched catalyst layer has an oxygen permeability that is at least three to five times as much as the oxygen permeability of the ionomer film 66 in the catalyst layer 60 before stretching.

Figure 8:
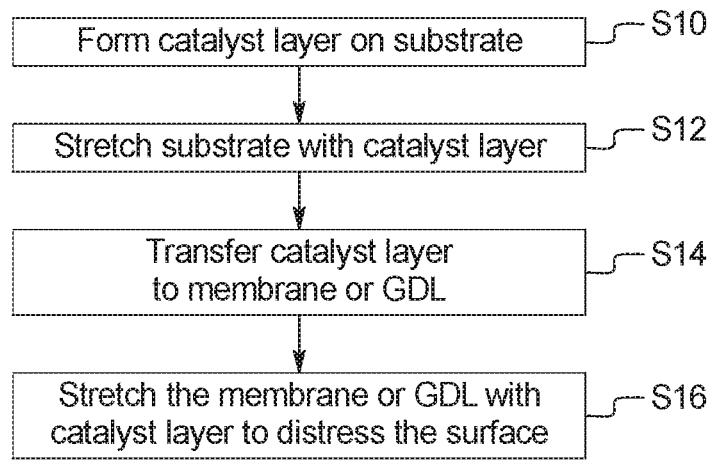
FIG. 8 is a flow chart illustrating a process of producing a stretched catalyst layer on a membrane or gas diffusion layer according to one embodiment.

FIG. 8 illustrates a method of producing a stretched catalyst layer on a membrane or GDL of a membrane electrode assembly according to an embodiment. In step S10, a catalyst layer is formed on a substrate. For example, a catalyst ink including catalyst particles, an ionomer and, optionally a binder, is sprayed, deposited, coated, brushed or otherwise placed on the substrate in any suitable manner to form a catalyst layer. The catalyst layer includes catalyst particles dispersed in an ionomer. The ionomer forms a thin film around the individual catalyst particles.

The catalyst particles can be formed of the same materials as the catalyst particles in the cathode catalyst layer 4 or the anode catalyst layer 6 of FIG. 1. For example, the catalyst particles can include at least one noble metal, such as platinum, palladium, gold, rhodium, ruthenium, iridium and/or alloys thereof. The catalyst particles can also include a transition metal such as cobalt, iron and/or nickel. The catalyst particles can further include support particles comprising carbon or a metal oxide doped with a conductive metal. For example, the catalyst particles can be platinum particles supported by carbon particles, a mixture of platinum and nickel particles supported by carbon particles, a mixture of platinum and cobalt particles supported by carbon particles, a mixture of platinum and ruthenium particles supported by carbon particles, or a mixture of platinum and iron particles supported by carbon particles. The ionomer film surrounding the catalyst particles can be formed of any suitable ionomer, for example perfluorosulfonic acid. The substrate can be a decal, an inert substrate or a hydrophobic substrate. For example, the substrate can be formed of PTFE.

In step S12, the catalyst layer is stretched together with the substrate. The catalyst layer and substrate may be stretched using any suitable stretching machine. For example, the catalyst layer and substrate may be stretched using a stretching machine manufactured by Intron Corporation.

The catalyst layer and substrate are stretched until the ionomer film surrounding the catalyst particles has an oxygen permeability of approximately $6.0 \times 10^{12}$ mol/cm/sec to $15.0 \times 10^{12}$ mol/cm/sec at a temperature of 80° C. and a relative humidity of approximately 30% to 100%. The oxygen permeability of the ionomer film can be measured using chronoamperometric analysis of the catalyst layer.

In step S14, the stretched catalyst layer is transferred from the stretched substrate to a membrane or GDL of a membrane electrode assembly. For example, the stretched substrate with the stretched catalyst layer thereon can be attached to a second substrate in any suitable manner, for example by hot pressing. The second substrate can be a decal or an inert substrate. The stretched substrate is then removed, leaving the stretched catalyst layer on the second substrate. The stretched substrate can be removed in any suitable manner, for example peeling or chemical removal. The stretched catalyst layer on the second substrate is then attached to the membrane or the GDL in any suitable manner, for example by hot pressing. The second substrate is then removed from the stretched catalyst layer in any suitable manner, for example peeling or chemical removal.

Alternatively, the stretched substrate with the stretched catalyst layer thereon can be combined with the membrane or GDL in any suitable manner to form a structure comprising the stretched substrate, the stretched catalyst layer and the membrane or GDL. For example, the stretched substrate with the stretched catalyst layer thereon can be physically attached, hot pressed at a suitable temperature and pressure, layered or otherwise attached to the membrane or GDL. The stretched substrate can then be removed, leaving the stretched catalyst layer formed on the membrane or GDL. The stretched substrate can be removed in any suitable manner, for example peeling or chemical removal.

In step S16, the stretched catalyst layer formed on the membrane or GDL can be further stretched to distress the surface of the stretched catalyst layer. This stretching may be performed using the same stretching machine used in step S12.

The stretched catalyst layer formed on the stretched membrane or GDL can then be incorporated into a membrane electrode assembly in any suitable manner. For example, the stretched catalyst layer formed on the stretched membrane or GDL can be used in the cathode side or the anode side of a membrane electrode assembly. The stretched catalyst layer formed on the stretched membrane or GDL is preferably used on the cathode side of a membrane electrode assembly.

Figure 9:
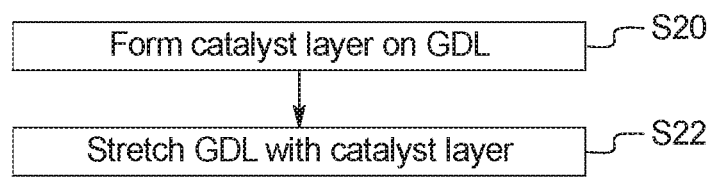
FIG. 9 is a flow chart illustrating a process of producing a stretched catalyst layer on a gas diffusion layer according to an embodiment.

FIG. 9 illustrates a method of producing a stretched catalyst layer on a GDL of a membrane electrode assembly according to an embodiment. In step S20, a catalyst layer is formed on a GDL. For example, a catalyst ink including catalyst particles, an ionomer and, optionally a binder, is sprayed, deposited, coated, brushed or otherwise placed on the GDL in any suitable manner to form a catalyst layer. The catalyst layer includes catalyst particles dispersed in an ionomer. The ionomer forms a thin film around the individual catalyst particles.

The catalyst particles can be formed of the same materials as the catalyst particles in the cathode catalyst layer 4 or the anode catalyst layer 6 of FIG. 1. For example, the catalyst particles can include at least one noble metal, such as platinum, palladium, gold, rhodium, ruthenium, iridium and/or alloys thereof. The catalyst particles can also include a transition metal such as cobalt, iron and/or nickel. The catalyst particles can further include support particles comprising carbon or a metal oxide doped with a conductive metal. For example, the catalyst particles can be platinum particles supported by carbon particles, a mixture of platinum and nickel particles supported by carbon particles, a mixture of platinum and cobalt particles supported by carbon particles, a mixture of platinum and ruthenium particles supported by carbon particles, or a mixture of platinum and iron particles supported by carbon particles. The ionomer film surrounding the catalyst particles can be formed of any suitable ionomer, for example perfluorosulfonic acid.

The GDL is a porous layer such as a carbon paper or a woven carbon fabric. The GDL can include a hydrophobic coating such as PTFE. The GDL can also include a microporous layer to improve the contact with the membrane and increase the surface area to allow the fuel or oxidant to reach the electrocatalyst sites in the catalyst layer.

In step S22, the catalyst layer is stretched together with the GDL. The catalyst layer and GDL may be stretched using any suitable stretching machine. For example, the catalyst layer and GDL may be stretched using a stretching machine manufactured by Intron Corporation. The catalyst layer and GDL can be stretched until the ionomer film in the catalyst layer has an oxygen permeability of approximately $6.0 \times 10^{12}$ mol/cm/sec to $15.0 \times 10^{12}$ mol/cm/sec at a temperature of 80° C. and a relative humidity of approximately 30% to 100%. The oxygen permeability of the ionomer film can be measured using chronoamperometric analysis of the catalyst layer.

Figure 10:
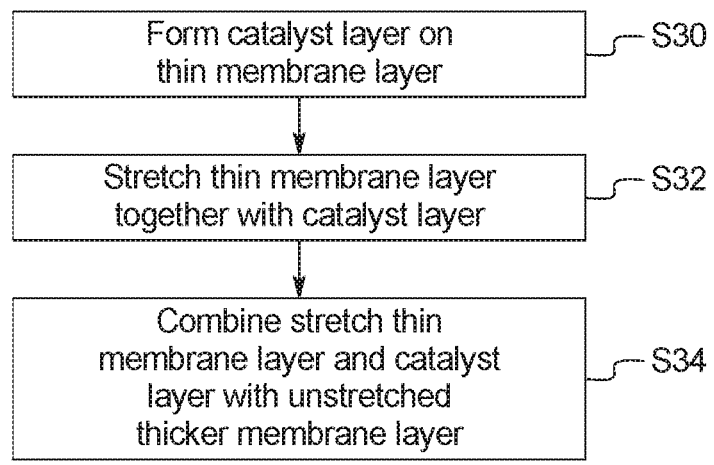
FIG. 10 is a flow chart illustrating a process of producing a stretched catalyst layer on a membrane according to an embodiment.

FIG. 10 illustrates a method of producing a stretched catalyst layer on a membrane of a membrane electrode assembly according to an embodiment. In step S30, a catalyst layer is formed on a thin membrane layer. For example, a catalyst ink including catalyst particles, an ionomer and, optionally a binder, is sprayed, deposited, coated, brushed or otherwise placed on the thin membrane in any suitable manner to form a catalyst layer. The catalyst layer includes catalyst particles dispersed in an ionomer. The ionomer forms a thin film around the individual catalyst particles.

The catalyst particles can be formed of the same materials as the catalyst particles in the cathode catalyst layer 4 or the anode catalyst layer 6 of FIG. 1. For example, the catalyst particles can include at least one noble metal, such as platinum, palladium, gold, rhodium, ruthenium, iridium and/or alloys thereof. The catalyst particles can also include a transition metal such as cobalt, iron and/or nickel. The catalyst particles can further include support particles comprising carbon or a metal oxide doped with a conductive metal. For example, the catalyst particles can be platinum particles supported by carbon particles, a mixture of platinum and nickel particles supported by carbon particles, a mixture of platinum and cobalt particles supported by carbon particles, a mixture of platinum and ruthenium particles supported by carbon particles, or a mixture of platinum and iron particles supported by carbon particles. The ionomer film surrounding the catalyst particles can be formed of any suitable ionomer, for example perfluorosulfonic acid.

The thin membrane layer is a polymer electrolyte membrane and can be formed of a polymer or a composite material in which materials are embedded in a polymer matrix. For example, the thin membrane layer can be formed of a cross-linked polymer or fluoropolymer such as perfluorosulfonic acid, perfluoroimide acid or mixtures thereof.

In step S32, the catalyst layer is stretched together with the thin membrane layer. The catalyst layer and thin membrane layer may be stretched using any suitable stretching machine. For example, the catalyst layer and thin membrane layer may be stretched using a stretching machine manufactured by Intron Corporation. The catalyst layer and thin membrane may be stretched until the ionomer film in the catalyst layer has an oxygen permeability of approximately $6.0 \times 10^{12}$ mol/cm/sec to $15.0 \times 10^{12}$ mol/cm/sec at a temperature of 80° C. and a relative humidity of approximately 30% to 100%. The oxygen permeability of the ionomer film can be measured using chronoamperometric analysis of the catalyst layer.

In step S34, the stretched thin membrane layer with the stretched catalyst layer is combined with a thicker membrane layer in any suitable manner. For example, the stretched thin membrane layer with the stretched catalyst layer formed thereon may be physically attached, hot pressed, layered or otherwise attached to the thicker membrane layer in any suitable manner. The thicker membrane layer may be formed of the same material(s) as the thin membrane layer but has a thickness greater than that of the thin membrane layer.

Example 1

A sample stretched catalyst layer on a GDL of a membrane electrode assembly was prepared. First a catalyst ink was prepared by mixing 0.9 g of a 20 wt % Nafion™ solution as an ionomer with 7.5 g of water, 3 g of isopropanol alcohol, and 0.4 g of carbon supported platinum particles in which the weight percent of platinum relative to the weight percent of carbon is 20%.

The catalyst ink materials were then mixed together and subjected to ultrasonic treatment at room temperature for an hour.

The catalyst ink was then sprayed onto a 5.2 cm×6.5 cm piece of carbon paper (25BCH manufactured by SGL Carbon Group Co., Ltd.) to form a catalyst layer on a GDL.

The catalyst layer formed on the carbon paper GDL was then stretched using a stretcher machine manufactured by Intron Corporation.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The term "configured" as used herein to describe a component, section or part of a device includes hardware and/or software that is constructed and/or programmed to carry out the desired function.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A membrane electrode assembly comprising:
    a polymer electrolyte membrane; and
    a catalyst layer provided on a surface of the polymer electrolyte membrane,
    the catalyst layer comprising catalyst particles and a porous ionomer film surrounding the catalyst particles, and
    the catalyst layer having a plurality of spaces formed within the catalyst layer such that the porous ionomer film has an oxygen permeability of $6.0\times10^{12}$ mol/cm/s to $15.0\times10^{12}$ mol/cm/s at 80° C. and a relative humidity of 30% to 100% when measured using chronoamperometric analysis of the catalyst layer,
    the catalyst particles comprising carbon support particles and at least one noble metal particle provided on a surface of the carbon support particles.

2. The membrane electrode assembly according to claim 1, wherein
    the noble metal particle comprises at least one selected from the group consisting of: ruthenium, rhodium, palladium, silver, osmium, iridium, platinum, gold and alloys thereof.

3. The membrane electrode assembly according to claim 2, wherein
    the noble metal particle is a platinum particle.

4. The membrane electrode assembly according to claim 1, wherein
    the porous ionomer film comprises a fluoropolymer.

5. The membrane electrode assembly according to claim 4, wherein
    the fluoropolymer is perfluorosulfonic acid.

6. The membrane electrode assembly according to claim 1, wherein
    the catalyst layer has a porosity of 30 volume % to 40 volume % with respect to a total volume of the catalyst layer.

7. The membrane electrode assembly according to claim 1, further comprising
    a gas diffusion layer provided on a surface of the catalyst layer that is opposite the polymer electrolyte membrane.

8. The membrane electrode assembly according to claim 1, wherein
    the catalyst layer is a cathode side catalyst layer.

9. A fuel cell comprising:
    the membrane electrode assembly according to claim 1,
    an anode on a first side of the membrane electrode assembly;
    a cathode on a second side of the membrane electrode assembly;
    an anode gas diffusion layer on a side of the anode that is opposite the membrane electrode assembly; and
    a cathode gas diffusion layer on a side of the cathode that is opposite the membrane electrode assembly.

10. The fuel cell according to claim 9, wherein
    the catalyst layer is a cathode side catalyst layer.

11. The membrane electrode assembly according to claim 1, wherein
    the porous ionomer film consists essentially of a single fluoropolymer-containing compound.

12. The membrane electrode assembly according to claim 1, wherein
    the porous ionomer film has a thickness of 1 nm to 10 nm.

13. The membrane electrode assembly according to claim 1, wherein
    the porous ionomer film is gapped such that its oxygen permeability is greater than that of an ungapped ionomer film having a same composition as that of the porous ionomer film.

* * * * *